B. G. MILLS.
SPLIT-WHEEL.
No. 176,234. Patented April 18, 1876.
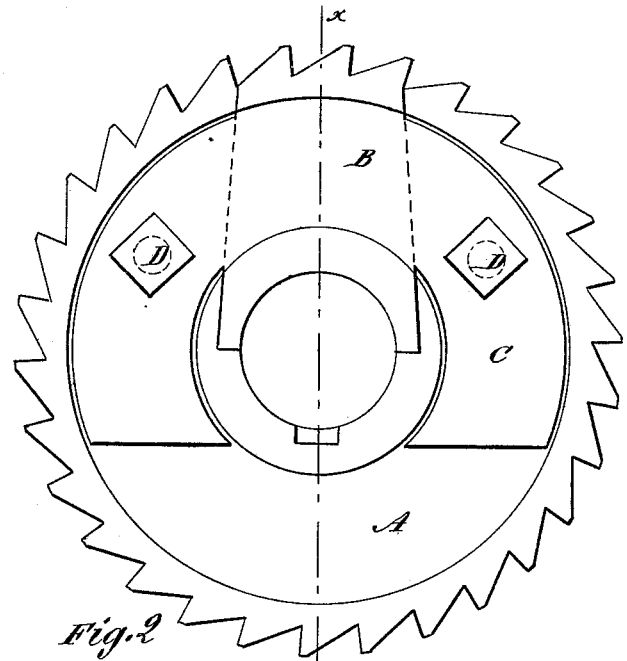
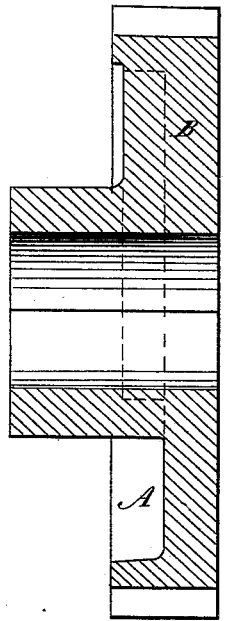
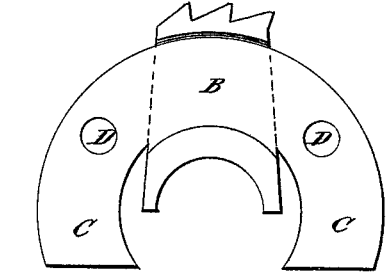
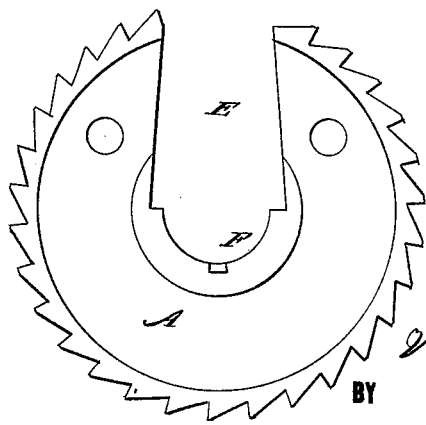
WITNESSES:
C. Neveux
John Goethals
INVENTOR:
B. G. Mills
BY
Munn
ATTORNEYS.

UNITED STATES PATENT OFFICE.

BENJAMIN G. MILLS, OF FALL RIVER, MASSACHUSETTS.

IMPROVEMENT IN SPLIT WHEELS.

Specification forming part of Letters Patent No. 176,234, dated April 18, 1876; application filed March 21, 1876.

*To all whom it may concern:*

Be it known that I, BENJAMIN G. MILLS, of Fall River, in the county of Bristol and State of Massachusetts, have invented a new and Improved Split Wheel, of which the following is a specification:

My invention consists of the two parts of a split gear or other wheel, so contrived that flanges on the side of one part fit upon and are bolted to the side of the other part, so as to allow of applying to and removing from the shaft such wheels in less space than is required when they are fastened by bolting two flanges together at the sides of the wheel, and it also allows of one part of the wheel being dovetailed in the other, to sustain the expanding action of the key better than in the common way.

Figure 1 is a side elevation of my improved split wheel. Fig. 2 is a section taken on line $x\,x$ of Fig. 1. Fig. 3 is a side elevation showing the two parts separated.

Similar letters of reference indicate corresponding parts.

A is one part of the wheel, and B the other. The latter has curved flanges C projecting from one side, suitably for fitting against the side of part A, so as to be secured thereto by bolts D, when the two parts are fitted together on the shaft.

In this example the part A comprises nearly the whole of the wheel, being only as much less as is necessary for the notch E to admit the shaft to the center F, and said notch is made in dovetail shape, so that the part B will be securely held against the expanding effect of the key, by which the wheel is secured to the shaft; but I do not limit myself to this arrangement, for the part B may comprise a third or more of the whole, and the dovetail form may be omitted.

When this dovetail form is employed, the part B will enter its notch in the other part from the direction of the shaft, in which case the wheel will have to be located as far from another wheel or other object on that side from which the part B enters as the thickness of the wheel at the hub.

Having thus described my invention, I claim as new and desire to secure by Letters Patent—

1. A split wheel composed of two parts, A and B, one of which has curved flanges C fitting and bolted to the side of the other, substantially as specified.

2. The part A, having the dovetail notch E, in combination with the part B, constructed to fit said dovetail notch, and having the flanges C, substantially as specified.

BENJAMIN G. MILLS.

Witnesses:
FREDERIC T. HATHAWAY,
HENRY H. EARL.